(12) United States Patent
Hayashi et al.

(10) Patent No.: US 11,990,276 B2
(45) Date of Patent: May 21, 2024

(54) ELECTROCHEMICAL DEVICE

(71) Applicant: Panasonic Intellectual Property Management Co., Ltd., Osaka (JP)

(72) Inventors: Hiroki Hayashi, Kyoto (JP); Motohiro Sakata, Osaka (JP); Nao Matsumura, Osaka (JP); Masatoshi Takeshita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 604 days.

(21) Appl. No.: 17/271,271

(22) PCT Filed: Sep. 25, 2019

(86) PCT No.: PCT/JP2019/037622
§ 371 (c)(1),
(2) Date: Feb. 25, 2021

(87) PCT Pub. No.: WO2020/067169
PCT Pub. Date: Apr. 2, 2020

(65) Prior Publication Data
US 2021/0391121 A1   Dec. 16, 2021

(30) Foreign Application Priority Data

Sep. 28, 2018   (JP) ................. 2018-185368

(51) Int. Cl.
*H01G 11/06*   (2013.01)
*H01G 11/48*   (2013.01)
(Continued)

(52) U.S. Cl.
CPC ............. *H01G 11/06* (2013.01); *H01G 11/48* (2013.01); *H01M 4/133* (2013.01); *H01M 10/0525* (2013.01); *H01M 10/0569* (2013.01)

(58) Field of Classification Search
CPC ........ H01G 11/06; H01G 11/24; H01G 11/48; H01G 11/62; H01M 10/0525; H01M 10/0569; H01M 4/133
See application file for complete search history.

(56) References Cited

U.S. PATENT DOCUMENTS

2009/0253033 A1   10/2009   Hirose et al.
2013/0330623 A1   12/2013   Matsushita et al.
2019/0334166 A1   10/2019   Ishii

FOREIGN PATENT DOCUMENTS

CN   101557008 A   10/2009
CN   103490093 A   1/2014
(Continued)

OTHER PUBLICATIONS

English Translation of Chinese Office Action dated Nov. 29, 2021 for the related Chinese Patent Application No. 201980061940.2.
(Continued)

*Primary Examiner* — Victoria H Lynch
(74) *Attorney, Agent, or Firm* — Rimon P.C.

(57) ABSTRACT

An electrochemical device includes a pair of electrodes and an electrolytic solution. At least one of the pair of electrodes includes an electrode current collector and an electrode material layer supported by the electrode current collector. The electrode material layer includes at least a conductive polymer. A log differential pore volume distribution of the electrode material layer has at least one peak in a range of a pore diameter of more than or equal to 50 nm.

5 Claims, 3 Drawing Sheets

(51) Int. Cl.
*H01M 4/133* (2010.01)
*H01M 10/0525* (2010.01)
*H01M 10/0569* (2010.01)

(56) References Cited

FOREIGN PATENT DOCUMENTS

| | | |
|---|---|---|
| JP | 2009-252580 | 10/2009 |
| JP | 2014-013748 | 1/2014 |
| JP | 2014-035836 | 2/2014 |
| WO | 2018/143048 | 8/2018 |

OTHER PUBLICATIONS

International Search Report of PCT application No. PCT/JP2019/037622 dated Dec. 17, 2019.
Japanese Office Action dated Sep. 5, 2021 for the related Japanese Patent Application No. 2020-549293.
Katsuji Takei, "Studies on Positive and Negative Electrode Materials of Lithium Secondary Batteries for Electric Power Storage", Central Research Institute of Electric Power Industry report, comprehensive report :T 52, Apr. 1998, Central Research Institute of Electric Power Industry.

ELECTROCHEMICAL DEVICE

CROSS-REFERENCE TO RELATED APPLICATIONS

This application is a U.S. national stage application of the PCT International Application No. PCT/JP2019/037622 filed on Sep. 25, 2019, which claims the benefit of foreign priority of Japanese patent application No. 2018-185368 filed on Sep. 28, 2018, the contents all of which are incorporated herein by reference.

TECHNICAL FIELD

The present invention relates to an electrochemical device that includes an electrode containing a conductive polymer.

BACKGROUND

In recent years, an electrochemical device that includes an electrode containing a conductive polymer capable of doping and dedoping of a dopant has been studied. For example, attention has been paid to an electrochemical device that includes a positive electrode containing a conductive polymer and a negative electrode containing a carbon material. The conductive polymer is capable of doping and dedoping of an anion as the dopant, and the carbon material is capable of occluding and releasing a lithium ion (see Unexamined Japanese Patent Publication No. 2014-35836). As the conductive polymer, polyaniline and the like are known.

SUMMARY

An electrode includes an electrode current collector and an electrode material layer supported by the electrode current collector. And the electrode material layer contains a conductive polymer. During charging and discharging, expansion and contraction of the conductive polymer due to doping and dedoping of a dopant generate stress in the electrode material layer. The electrode current collector closely attached to the electrode material layer is affected by the stress to sometimes generate a breakage (crack) on the electrode current collector. The breakage on the electrode current collector tends to affect performance of the electrochemical device.

In view of solving the above problems, an electrochemical device according to one aspect of the present invention includes a pair of electrodes and an electrolytic solution. At least one of the pair of electrodes includes an electrode current collector and an electrode material layer supported by the electrode current collector. The electrode material layer includes at least a conductive polymer. A log differential pore volume distribution of the electrode material layer has at least one peak in a range of a pore diameter of more than or equal to 50 nm.

According to the present invention, in an electrochemical device that includes an electrode including an electrode material layer supported by an electrode current collector, the electrode material layer including a conductive polymer capable of doping and dedoping of a dopant, it is possible to suppress a breakage in the electrode current collector which is generated along with charging and discharging.

DESCRIPTION OF EMBODIMENT

An electrochemical device according to an exemplary embodiment of the present invention includes a pair of electrodes and an electrolytic solution. At least one of the pair of electrodes includes an electrode current collector and an electrode material layer supported by the electrode current collector. The electrode material layer includes at least a conductive polymer.

The conductive polymer is capable of doping and dedoping of a dopant. The conductive polymer constitutes, for example, a porous film. In the present invention, the conductive polymer in a state of dedoping may be hardly conductive or may be non-conductive. The conductive polymer can be used as a positive electrode active material and/or a negative electrode active material according to a configuration of the electrochemical device. The electrode material layer may also include a conducting agent or a binder in addition to the conductive polymer. The electrode material layer may be disposed directly on the electrode current collector or may be disposed on the electrode current collector with another layer interposed between the electrode material layer and the electrode current collector. The another layer is provided for a purpose of, for example, reducing contact resistance between the electrode material layer and the electrode current collector.

A log differential pore volume distribution of the electrode material layer has at least one peak in a range of a pore diameter of more than or equal to 50 nm. The log differential pore volume distribution is measured by a mercury intrusion technique. When a pore diameter at the peak in the log differential pore volume distribution is more than or equal to 50 nm, stress generated in the electrode material layer due to expansion and contraction of the conductive polymer during charging and discharging is alleviated. Hence, the electrode current collector closely attached to the electrode material layer is less likely to receive stress, and thus a breakage on the electrode current collector is suppressed. When the log differential pore volume distribution has a plurality of peaks, it is preferred that at least a maximum peak among the plurality of peaks exists in the range of a pore diameter of more than or equal to 50 nm, and it is more preferred that all the plurality of peaks exist in the range of a pore diameter of more than or equal to 50 nm.

The peak in the log differential pore volume distribution preferably exists in a range of a pore diameter from 50 nm to 8000 nm, inclusive. In this case, the breakage on the electrode current collector is further easily suppressed. By controlling a pore diameter at the peak to be less than or equal to 8000 nm, a ratio of large pore-diameter pores existing in the electrode material layer can be appropriately suppressed. Thus, good adhesiveness between the electrode material layer and the electrode current collector can be secured. Hence, peeling of the electrode material layer from the electrode current collector is also suppressed. When the log differential pore volume distribution has a plurality of peaks, it is more preferred that at least a maximum peak among the plurality of peaks exists in the range of a pore diameter from 50 nm to 8000 nm, inclusive, and it is further preferred that all the plurality of peaks exist in the range of a pore diameter from 50 nm to 8000 nm, inclusive.

A log differential pore volume distribution of the electrode material layer has a first peak and a second peak in the range of a pore diameter from 50 nm to 8000 nm, inclusive. When a log differential pore volume $P_1$ at the first peak is greater than a log differential pore volume $P_2$ at the second peak, it is preferred that a pore diameter (first peak pore diameter) at the first peak is greater than a pore diameter (second peak pore diameter) at the second peak.

When P1>P2 is satisfied, pores that have a relatively large pore diameter corresponding to the first peak have a large volume ratio to improve infiltration of the electrolytic solution into the electrode material layer. Hence, reaction resistance is considered to be reduced. From a viewpoint of further improving the infiltration of the electrolytic solution into the electrode material layer, the first peak pore diameter is preferably more than 50 nm and less than or equal to 8000 nm, more preferably more than 150 nm and less than or equal to 8000 nm.

Pores that have a relatively small pore diameter corresponding to the second peak is considered to contribute to an increase of effective reaction area of the electrode material layer, and thus to also contribute to an increase of capacitance and a reduction of reaction resistance. From a viewpoint of further increasing the effective reaction area of the electrode material layer, the second peak pore diameter may be preferably more than or equal to 50 nm and less than 8000 nm, more preferably more than or equal to 50 nm and less than or equal to 150 nm. This enables the electrode material layer to have many adsorption sites of a dopant.

A ratio $P_1/P_2$ of the log differential pore volume $P_1$ at the first peak to the log differential pore volume $P_2$ at the second peak is preferably more than or equal to 1.83. In this case, an effect of reducing the reaction resistance can be remarkably improved by a combination of improvement in the infiltration of the electrolytic solution into the electrode material layer and an increase of the effective reaction area of the electrode material layer. Further, the reduction of the reaction resistance and the effect of improving the capacitance can be achieved with better balance.

The electrode can be obtained, for example, by forming, through electrolytic polymerization, a conductive polymer film as the electrode material layer on a surface of the electrode current collector, washing the film, and drying the film. The drying may be performed at, for example, 40° C. to 120° C. (for example, 50° C.) for approximately 3 minutes to 5 hours (for example, 8 minutes). The dried electrode material layer may be pressed and thereafter further vacuum-dried. The vacuum drying after the pressing may be performed at, for example, 40° C. to 200° C. (for example, 110° C.) for approximately 1 hour to 48 hours (for example, 12 hours).

A position of the peak (the pore diameter at which the peak appears) in the log differential pore volume distribution of the electrode material layer can be controlled by, for example, pressing pressure applied to the electrode material layer. As the pressing pressure is increased, a pore diameter at the peak tends to become small. A number of peaks can be controlled, for example, by changing stirring speed (flow speed) of an electrolytic polymerization solution or changing current density in several stages during electrolytic polymerization. A method for making the first peak and the second peak appear in the log differential pore volume distribution is, for example, a method for setting stirring speed (flow speed) of an electrolytic polymerization solution at more than or equal to a prescribed value, or a method for changing current density in two stages during electrolytic polymerization. The ratio $P_1/P_2$ can be controlled by adjusting current density during electrolytic polymerization. For example, as the current density during electrolytic polymerization is increased, the $P_1/P_2$ tends to become large ($P_2$ becomes small).

Figure 1:
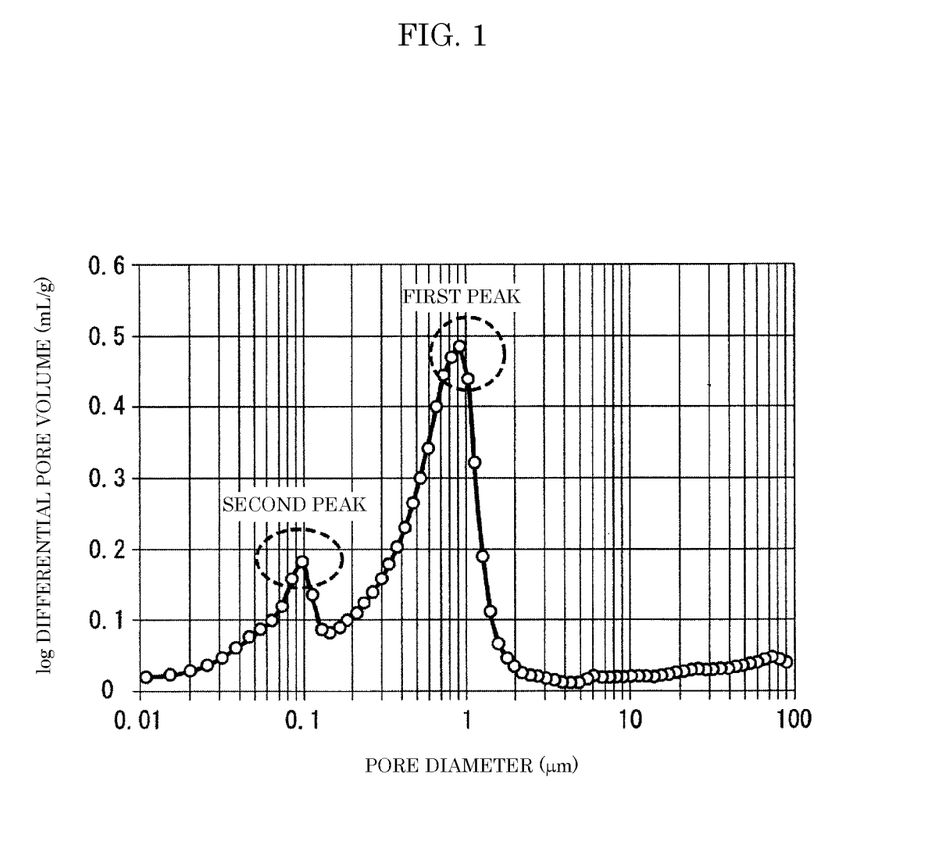
FIG. 1 is a graph showing one example of log differential pore volume distribution of an electrode material layer in an electrochemical device according to an exemplary embodiment of the present invention, the distribution being measured by a mercury intrusion technique.

Here, FIG. 1 is a graph illustrating one example of log differential pore volume distribution of an electrode material layer in an electrochemical device according to an exemplary embodiment of the present invention. Here, the log differential pore volume distribution is measured by a mercury intrusion technique. In FIG. 1, a horizontal axis represents the pore diameter (μm) and a vertical axis represents the log differential pore volume (mL/g). The log differential pore volume is represented by dV/d(log D), in which D represents the pore diameter and V represents the pore volume.

The log differential pore volume distribution illustrated in FIG. 1 has a curve including a first peak and a second peak in a range of a pore diameter from 50 nm to 8000 nm, inclusive. A log differential pore volume $P_1$ at the first peak is greater than a log differential pore volume $P_2$ at the second peak, and a pore diameter at the first peak is greater than a pore diameter at the second peak. A ratio $P_1/P_2$ of the log differential pore volume $P_1$ at the first peak to the log differential pore volume $P_2$ at the second peak is more than or equal to 1.83.

Measurement of the log differential pore volume distribution is preferably performed in a state where a dopant is desorbed from the conductive polymer (in a state of dedoping). Since an influence of the dopant can be reduced, a more accurate log differential pore volume distribution of the conductive polymer film can be obtained. The state where a dopant is desorbed from the conductive polymer means not only a state where a dopant is completely desorbed from the conductive polymer, but also a state where a dopant doped in the conductive polymer slightly remains. When a conductive polymer capable of doping and dedoping of an anion as the dopant is used as the positive electrode active material, the state where a dopant is desorbed from the conductive polymer means that the electrochemical device is discharged.

The electrochemical device in a state of discharging means an electrochemical device whose voltage has reached a lower limit value (discharge cutoff voltage) of rated voltage during discharging. When a π-conjugated polymer is used as the positive electrode active material and a carbon material is used as the negative electrode active material, the discharge cutoff voltage is set at, for example, 2.5 V to 2.6 V. When π-conjugated polymer is used as the positive electrode active material and lithium titanate is used as the negative electrode active material, the discharge cutoff voltage is set at, for example, 1.1 V to 1.2 V.

The log differential pore volume distribution of the electrode material layer including the conductive polymer can be obtained by a following procedure. The electrochemical device is disassembled, and the electrode that includes the electrode material layer including the conductive polymer is taken out, washed with a low boiling-point solvent such as dimethyl carbonate (DMC), and dried. The electrode is cut at a prescribed size to give a sample. The log differential pore volume distribution of the sample (electrode material layer) is measured using a mercury intrusion porosimeter.

More specifically, when the electrochemical device includes a positive electrode that includes a positive electrode material layer including the conductive polymer capable of doping and dedoping of an anion as the dopant, the log differential pore volume of the positive electrode material layer can be obtained by a procedure of following [Measurement 1] or [Measurement 2].

[Measurement 1]

The electrochemical device is discharged until the voltage thereof reaches a lower limit value of rated voltage. In the discharging, the dopant is desorbed from the conductive polymer. Thereafter, the electrochemical device is disassembled, and the positive electrode including the positive electrode material layer is taken out, washed with a low boiling-point solvent, and dried. The positive electrode is cut at a prescribed size (50 mm×100 mm) to give a sample. The log differential pore volume distribution of the sample (positive electrode material layer) is measured using a mercury intrusion porosimeter (for example, Auto Pore IV manufactured by SHIMADZU CORPORATION).

[Measurement 2]

The electrochemical device is disassembled, and the positive electrode including the positive electrode material layer is taken out, washed with a low boiling-point solvent, and dried. A laminate cell is produced using the obtained positive electrode, a negative electrode, and an electrolytic solution. A metallic lithium is used as the negative electrode. As the electrolytic solution, a solution usable in an electrochemical device (for example, a solution containing $LiPF_6$ as a lithium salt) is used. The laminate cell produced above is retained at a voltage of 2.5 V for 1 hour. In the retention, the dopant is desorbed from the conductive polymer. After the retention, the laminate cell is disassembled, and the positive electrode including the positive electrode material layer is taken out, washed with a low boiling-point solvent, and dried. Thereafter, the positive electrode is cut at a prescribed size (50 mm×100 mm) to give a sample. The log differential pore volume distribution of the sample (positive electrode material layer) is measured using a mercury intrusion porosimeter (for example, Auto Pore IV manufactured by SHIMADZU CORPORATION).

The electrochemical device preferably includes: a positive electrode including, as a positive electrode active material layer, a conductive polymer capable of doping and dedoping of an anion as a dopant; a negative electrode including a negative electrode active material capable of occluding and releasing a lithium ion; and an electrolytic solution containing the anion and the lithium ion. The electrochemical device like this has intermediate performance between a lithium ion secondary battery and an electric double-layer capacitor. Charging and discharging are performed by doping and dedoping of the dopant to make reaction resistance small, and thus higher output than output of a general lithium ion secondary battery can be obtained.

During the charging, the conductive polymer is doped with the anion contained in the electrolytic solution, and the negative electrode active material occludes the lithium ion contained in the electrolytic solution. In the discharging, an anion dedoped from the conductive polymer moves into the electrolytic solution and a lithium ion released from the negative electrode active material moves into the electrolytic solution.

The conductive polymer is preferably a π-electron conjugated polymer that has a repeating unit containing a hetero atom. The hetero atom (a nitrogen atom, a sulfur atom, or the like) of the π-electron conjugated polymer is likely to interact with an anion. The anion is considered to be adsorbed or desorbed from the hetero atom in oxidation and reduction of the conductive polymer in accordance with charging and discharging.

As the π-electron conjugated polymer, it is possible to use, for example, a homopolymer and/or a copolymer of at least one polymerizable compound selected from the group consisting of aniline, pyrrole, thiophene, furan, thiophene vinylene, pyridine, and derivatives thereof. That is, as the π-electron conjugated polymer, it is possible to use a homopolymer containing a monomer unit derived from an above polymerizable compound, and a copolymer containing a monomer unit derived from two or more of the above polymerizable compounds. More specifically, polyaniline, polypyrrole, polythiophene, polyfuran, polythiophene vinylene, polypyridine, and polymer derivatives containing these polymers as a basic skeleton can be obtained. The polymer derivatives are polymers of derivative compounds such as an aniline derivative, a pyrrole derivative, a thiophene derivative, a furan derivative, a thiophene vinylene derivative, and a pyridine derivative. Examples include poly(3,4-ethylenedioxythiophene) (PEDOT) having polythiophene as a basic skeleton. Among these examples, the π-electron conjugated polymer is preferably polyaniline that has a high capacity density.

Examples of the anion with which the conductive polymer can be doped and dedoped in accordance with charging and discharging include $ClO_4^-$, $BF_4^-$, $PF_6^-$, $AlCl_4^-$, $SbF_6^-$, $SCN^-$, $CF_3SO_3^-$, $FSO_3^-$, $CF_3CO_2^-$, $AsF_6^-$, $B_{10}Cl_{10}^-$, $Cl^-$, $Br^-$, $I^-$, $BCl_4^-$, $N(FSO_2)_2^-$, and $N(CF_3SO_2)_2^-$. Among these examples, the anion is preferably a halogen atom-containing oxo-acid anion, an imide anion, or the like. As the halogen atom-containing oxo-acid anion, a tetrafluoroborate anion ($BF_4^-$), a hexafluorophosphate anion ($PF_6^-$), a perchlorate anion ($ClO_4^-$), a fluorosulfate anion ($FSO_3^-$), and the like are preferable. Among these examples, $PF_6^-$ with which the conductive polymer is easily reversibly doped and dedoped is more preferable, and $PF_6^-$ may account for more than or equal to 90 mol % of all anions contained in the electrolytic solution in a charge state and a discharge state. As the imide anion, bis(fluorosulfonyl)imide anion ($N(FSO_2)_2^-$) is preferable. A single one or two or more in combination of these anions may be used.

Hereinafter, described in detail is an electrochemical device including: a positive electrode including, as a positive electrode active material, a conductive polymer capable of doping and dedoping of an anion; and a negative electrode containing a negative electrode active material capable of occluding and releasing a lithium ion.

(Positive Electrode)

The positive electrode includes a positive electrode material layer including a conductive polymer as a positive electrode active material. The positive electrode material layer is supported by a positive electrode current collector. As the positive electrode current collector, a conductive sheet material is used, for example. As the sheet material, a metal foil, a metal porous body, a punched metal, or the like is used. As a material for the positive electrode current collector, it is possible to use aluminum, an aluminum alloy, nickel, titanium, and the like.

The positive electrode material layer may further include a conducting agent and a binder in addition to the positive electrode active material. Examples of the conducting agent include carbon black and a carbon fiber. Examples of the binder include fluorine resin, acrylic resin, a rubber material, and a cellulose derivative.

The conductive polymer included in the positive electrode material layer is synthesized by polymerizing a polymerizable compound (monomer) as a raw material of the conductive polymer. The synthesis of the conductive polymer may be performed by electrolytic polymerization or chemical polymerization. For example, a conductive polymer film (positive electrode material layer) may be formed to cover at least a part of a surface of the positive electrode current collector by the following procedures. The procedures are: preparing a conductive sheet material (for example, a metal foil) as the positive electrode current collector; immersing the positive electrode current collector and an opposite electrode in a monomer solution; and flowing current between the positive electrode current collector and the opposite electrode with the positive electrode current collector set as an anode. The monomer solution may contain, as a dopant, an anion described above and may also contain an anion, such as a sulfate ion or a nitrate ion, which is other than the anions described above as examples. An oxidant that accelerates the electrolytic polymerization may be added.

(Negative Electrode)

The negative electrode includes, for example, a negative electrode material layer including a negative electrode active material. The negative electrode material layer is usually supported by a negative electrode current collector. As the negative electrode current collector, a conductive sheet material is used, for example. As the sheet material, a metal foil, a metal porous body, a punched metal, or the like is used. As a material for the negative electrode current collector, it is possible to use copper, a copper alloy, nickel, stainless steel, and the like.

Examples of the negative electrode active material include a carbon material, a metal compound, an alloy, and a ceramic material. As the carbon material, graphite, non-graphitizable carbon (hard carbon), and easily graphitizable carbon (soft carbon) are preferable, and graphite and hard carbon are particularly preferable. Examples of the metal compound include silicon oxide and tin oxide. Examples of the alloy include a silicon alloy and a tin alloy. Examples of the ceramic material include lithium titanate and lithium manganate. A single one or two or more in combination of these materials may be used. Among these examples, a carbon material is preferable in terms of being capable of decreasing potential of the negative electrode.

The negative electrode material layer preferably includes a conducting agent, a binder, or the like in addition to the negative electrode active material. As the conducting agent and the binder, those described above as examples of the conducting agent and the binder in the positive electrode material layer can be used.

The negative electrode is preferably pre-doped with a lithium ion in advance. This process decreases potential of the negative electrode to increase a difference in potential (that is, voltage) between the positive electrode and the negative electrode, and thus an energy density of the electrochemical device can be improved.

The pre-doping of the negative electrode with a lithium ion is progressed by, for example, the following procedures. The procedures are: forming a metallic lithium layer that is to serve as a supply source of the lithium ion on a surface of the negative electrode material layer; eluting the lithium ion from the metallic lithium layer into the electrolytic solution; and allowing the negative electrode active material to occlude the eluted lithium ion. For example, when graphite or hard carbon is used as the negative electrode active material, the lithium ion is inserted in between layers of the graphite or in pores of the hard carbon. An amount of the lithium ion for the pre-doping can be controlled by a mass of the metallic lithium layer.

The negative electrode material layer included in the negative electrode is formed by, for example, the following procedures. The procedures are: mixing the negative electrode active material, the conducting agent, the binder, and the like with a dispersion medium to prepare a negative electrode mixture paste; and applying the negative electrode mixture paste to the negative electrode current collector.

The step of pre-doping the negative electrode with a lithium ion may be performed before assembling an electrode group, or the pre-doping may be progressed after housing an electrode group together with an electrolytic solution in a case of the electrochemical device.

(Electrolytic Solution)

The electrolytic solution (nonaqueous electrolytic solution) contains a nonaqueous solvent and a lithium salt dissolved in the nonaqueous solvent. The lithium salt includes the anion with which the conductive polymer is doped and the lithium ion occluded in the negative electrode active material during charging.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. A single one or two or more in combination of these lithium salts may be used. A concentration of the lithium salt in the electrolytic solution ranges, for example, from 0.2 mol/L to 4 mol/L.

As the nonaqueous solvent, it is possible to use, for example, cyclic carbonates such as ethylene carbonate, propylene carbonate (PC), and butylene carbonate; chain carbonates such as dimethyl carbonate (DMC), diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone. A single one or two or more in combination of these nonaqueous solvents may be used.

The electrolytic solution may be prepared by adding an additive agent to the nonaqueous solvent as necessary. For example, an unsaturated carbonate such as vinylene carbonate, vinyl ethylene carbonate, or divinyl ethylene carbonate may be added as an additive agent for forming a covering film having high lithium-ion conductivity on a surface of the negative electrode.

(Separator)

A separator is preferably disposed between the positive electrode and the negative electrode. As the separator, for example, a nonwoven fabric made of cellulose fiber, a nonwoven fabric made of glass fiber, a microporous membrane made of polyolefin, a fabric cloth, and a nonwoven fabric are used. The separator has a thickness ranging, for example, from 10 μm to 300 μm, preferably from 10 μm to 40 μm.

An electrochemical device according to an exemplary embodiment of the present invention is described with reference to FIGS. 2 and 3.

Figure 2:
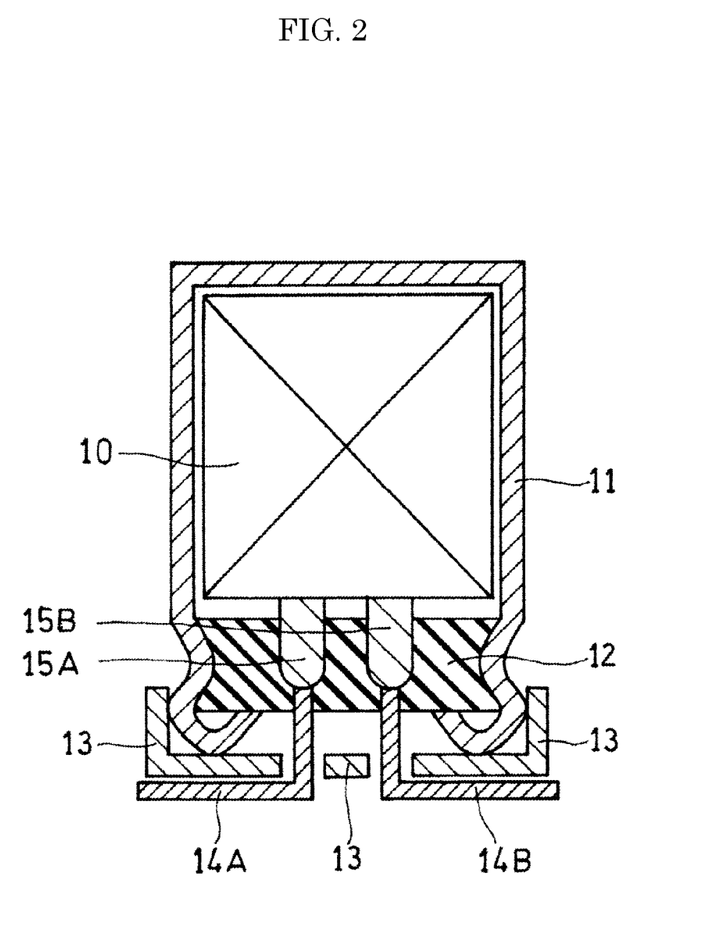
FIG. 2 is a schematic sectional view illustrating an electrochemical device according to an exemplary embodiment of the present invention.
Figure 3:
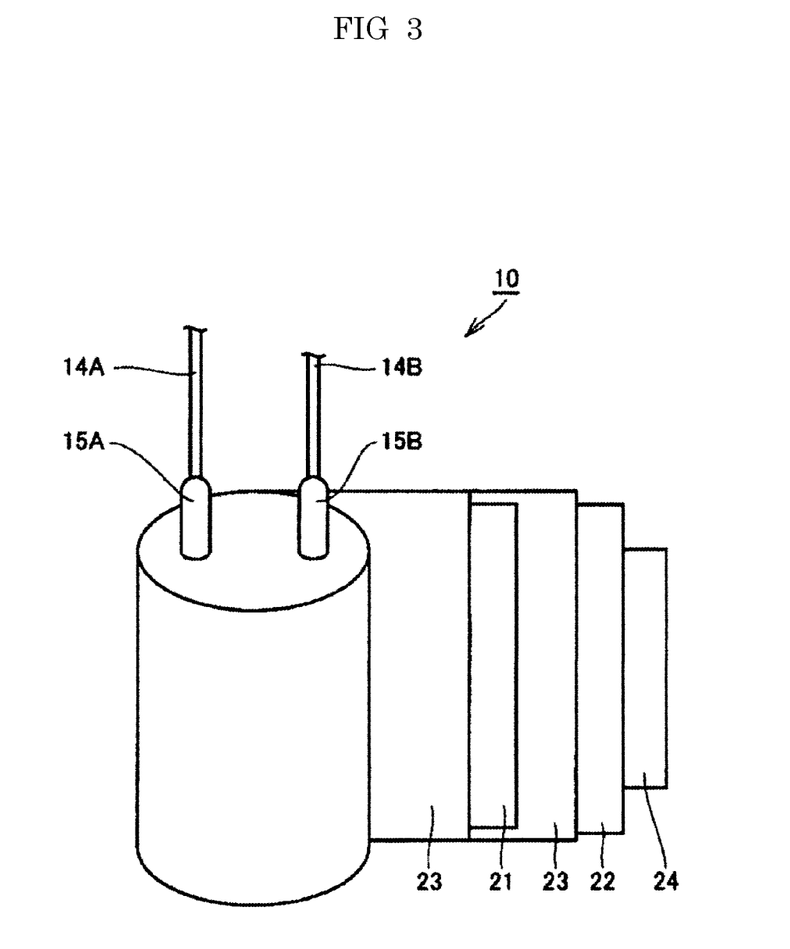
FIG. 3 is a schematic view for describing a configuration of the electrochemical device according to the same exemplary embodiment.

Electrode group 10 is a wound body illustrated in FIG. 3 and includes positive electrode 21, negative electrode 22, and separator 23 disposed between the positive electrode and the negative electrode. An outermost periphery of the wound body is fixed with fastening tape 24. Positive electrode 21 is connected to lead tab 15A and negative electrode 22 is connected to lead tab 15B. The electrochemical device includes electrode group 10, bottomed case 11 housing electrode group 10, sealing body 12 sealing an opening of bottomed case 11, lead wires 14A, 14B led out from sealing body 12, and an electrolytic solution (not shown). Lead wires 14A, 14B are respectively connected to lead tabs 15A, 15B. Sealing body 12 is formed of, for example, an elastic material containing a rubber component. A part of bottomed case 11 near an opening end is drawn inward, and the opening end is curled to swage sealing body 12.

The exemplary embodiment describes a cylinder-shaped electrochemical device including a wound electrode group. Meanwhile, a polygon-shaped electrochemical device may be configured that includes a laminated electrode group of the positive electrode, the negative electrode, and the separator disposed between both the electrodes.

EXAMPLES

Hereinafter, the present invention is described in more detail based on examples. The present invention, however, is not to be limited to the examples.

Example 1

(1) Production of Positive Electrode

A 30-μm-thick aluminum foil was prepared as a positive electrode current collector. On the other hand, an aqueous aniline solution containing aniline and sulfuric acid was prepared. The positive electrode current collector and an opposite electrode were immersed in the aqueous aniline solution to perform electrolytic polymerization for 20 minutes. The electrolytic polymerization was performed by changing current density in two stages, 5 mA/cm$^2$ and 10 mA/cm$^2$. Thus, a porous film (positive electrode material layer) of a conductive polymer (polyaniline) doped with a sulfate ion ($SO_4^{2-}$) as a dopant was attached to entire front and back surfaces of the positive electrode current collector to give a positive electrode. The positive electrode material layer was sufficiently washed, thereafter dried at 50° C. for 8 minutes, pressed together with the positive electrode current collector at a prescribed pressure, and vacuum-dried at 110° C. for 12 hours. The positive electrode material layer had a thickness of 60 μm per one surface of the positive electrode current collector.

(2) Production of Negative Electrode

A 20-μm-thick copper foil was prepared as a negative electrode current collector. Meanwhile, a carbon paste was prepared by kneading a mixed powder containing 97 parts by mass of hard carbon, 1 part by mass of carboxy cellulose, and 2 parts by mass of styrene-butadiene rubber with water at a ratio (mixed powder:water) by weight of 40:60. The carbon paste was applied to both surfaces of the negative electrode current collector and dried to give a negative electrode including a 35-μm-thick negative electrode material layer on both surfaces thereof. Next, a metallic lithium layer was formed on the negative electrode material layer in an amount calculated so that the negative electrode that had been pre-doped and was in an electrolytic solution had a potential of less than or equal to 0.2 V with respect to a potential of metallic lithium.

(3) Production of Electrode Group

Lead tabs were respectively connected to the positive electrode and the negative electrode, and then, as illustrated in FIG. 2, a stacked body obtained by alternately stacking a nonwoven fabric separator (thickness 35 μm) made of cellulose, the positive electrode, and the negative electrode was wound to form an electrode group.

(4) Preparation of Electrolytic Solution

A nonaqueous solvent was prepared by adding 0.2% by mass of vinylene carbonate to a mixture containing propylene carbonate and dimethyl carbonate at a ratio (propylene carbonate:dimethyl carbonate) by volume of 1:1. In the obtained nonaqueous solvent, LiPF6 was dissolved as a lithium salt at 2 mol/L to prepare an electrolytic solution containing a hexafluorophosphate ion (PF6−) as an anion.

(5) Production of Electrochemical Devices

The electrode group and the electrolytic solution were housed in a bottomed case having an opening to assemble the electrochemical device illustrated in FIG. 2. Thereafter, aging was performed at 25° C. for 24 hours while a charge voltage of 3.8 V was applied between terminals of the positive electrode and the negative electrode, to progress pre-doping of the negative electrode with a lithium ion. Thus, the electrochemical device having an inter-terminal voltage of 3.2 V was completed.

In the production of the positive electrode, the pressing pressure applied to the positive electrode material layer was changed in a range from 200 kgf/cm$^2$ to 600 kgf/cm$^2$, inclusive, to give positive electrode material layers having different peak pore diameters of log differential pore volume distribution. Specifically, the pore diameters at which the peak appeared in the log differential pore volume distributions of the positive electrode material layers were set at values represented by Table 1. As the pressing pressure applied to the positive electrode material layer was increased, the peak pore diameter was observed to tend to become small. Electrochemical devices A1 to A4 and B1 were produced using the positive electrode material layers having different peak pore diameters of log differential pore volume distribution.

[Evaluation 1: Confirmation of Breakage on Positive Electrode Current Collector]

The electrochemical devices obtained above were subjected to a charge and discharge test including charging, a pause, and discharging in this order, under following conditions. The charging and discharging were repeated 100,000 times.

Environmental temperature: 25° C.

Charging: charging at constant current of 1C until charge cutoff voltage of 3.8 V Pause: 5 minutes Discharging: discharging at constant current of 1 C until discharge cutoff voltage of 2.5 V The charged and discharged electrochemical devices were disassembled, the positive electrodes were taken out, and the positive electrode current collectors were confirmed by visual inspection for the presence or absence of a breakage (crack).

Table 1 shows evaluation results. The peak pore diameter in Table 1 represents the pore diameter at the first peak (maximum peak). The electrochemical device B1 in Table 1 is a comparative example.

TABLE 1

| Electrochemical device No. | Peak pore diameter (μm) | Breakage on positive electrode current collector |
| --- | --- | --- |
| B1 | 0.047 | Present |
| A1 | 0.052 | None |

TABLE 1-continued

| Electrochemical device No. | Peak pore diameter (μm) | Breakage on positive electrode current collector |
|---|---|---|
| A2 | 0.545 | None |
| A3 | 0.945 | None |
| A4 | 2.007 | None |

The log differential pore volume distributions of the positive electrode material layers in the electrochemical devices A1 to A4 and B1 were measured by the aforementioned method (Measurement 1). As a result of the measurement, in the log differential pore volume distributions of the positive electrode material layers in the electrochemical devices A1 to A4, two peaks (the first peak and the second peak) were observed in a range of a pore diameter of more than or equal to 0.05 μm. On the other hand, in the log differential pore volume distribution of the positive electrode material layer in the electrochemical device B1, two peaks (the first peak and the second peak) were observed in a range of a pore diameter of less than 0.05 μm. The log differential pore volume at the first peak was greater than the log differential pore volume at the second peak, and the pore diameter at the first peak was greater than the pore diameter at the second peak.

In the electrochemical devices A1 to A4, no breakage was observed on the positive electrode current collector.

In the electrochemical device B1, a breakage was observed on the positive electrode current collector.

Example 2

In the production of the positive electrode, the pressing pressure applied to the positive electrode material layer was changed in a range from 200 kgf/cm$^2$ to 600 kgf/cm$^2$, inclusive, to give positive electrode material layers having different peak pore diameters of log differential pore volume distribution. Specifically, the pore diameters at which the peak appeared in the log differential pore volume distributions of the positive electrode material layers were set at values represented by Table 2. Except for the matter described above, electrochemical devices C1 to C4 were produced similarly to the electrochemical device A1.

The electrochemical devices C1 to C4 were, in Evaluation 1, confirmed by visual inspection for the presence or absence of a breakage on the positive electrode current collector together with the presence or absence of peeling of the positive electrode material layer from the positive electrode current collector.

Table 2 shows evaluation results. The peak pore diameter in Table 2 represents the pore diameter at the first peak (maximum peak).

TABLE 2

| Electrochemical device No. | Peak pore diameter (μm) | Breakage on positive electrode current collector | Peeling of positive electrode material layer |
|---|---|---|---|
| C1 | 0.64 | None | None |
| C2 | 2.35 | None | None |
| C3 | 7.93 | None | None |
| C4 | 8.22 | None | Present |

The log differential pore volume distributions of the positive electrode material layers in the electrochemical devices C1 to C4 were measured by the aforementioned method (Measurement 1). As a result of the measurement, in the log differential pore volume distributions of the positive electrode material layers in the electrochemical devices C1 to C3, two peaks (the first peak and the second peak) were observed in a range of a pore diameter from 0.05 μm to 8 μm, inclusive. On the other hand, in the log differential pore volume distribution of the positive electrode material layer in the electrochemical device C4, two peaks (the first peak and the second peak) were observed, but the first peak was observed in a range of a pore diameter of more than 8 μm.

In the electrochemical devices C1 to C3, no breakage was observed on the positive electrode current collector and no peeling of the positive electrode material layer from the positive electrode current collector was observed.

In the electrochemical device C4, no breakage was observed on the positive electrode current collector, but partial peeling of the positive electrode material layer from the positive electrode current collector was observed.

Example 3

In the production of the positive electrode, the electrolytic polymerization was performed in two stages of current density to allow two peaks (the first peak and the second peak) to appear in the log differential pore volume distribution of the positive electrode material layer. By changing the two-stage current density during the electrolytic polymerization in a range from 1 mA/cm$^2$ to 100 mA/cm$^2$, inclusive, the log differential pore volume $P_1$ at the first peak, the log differential pore volume $P_2$ at the second peak, and the $P_1/P_2$ were set at values represented by Table 3. As the two-stage current density during the electrolytic polymerization was increased in the range, the value of the $P_1/P_2$ was observed to tend to become small.

Except for the matter described above, electrochemical devices D1 to D12 were produced similarly to the electrochemical device A1.

The electrochemical devices D1 to D12 were measured for direct current resistance (DCR) as follows in addition to Evaluation 1.

[Evaluation 2: Measurement of DCR (Direct Current Resistance) of Electrochemical Devices]

The electrochemical device was charged in an environment of 25° C. and prepared. The charging was performed under the same charging conditions as in Evaluation 1.

Thereafter, the electrochemical device was constant-current discharged at a current I of 1 C in an environment of 25° C. A value (ΔV/I) obtained by dividing a voltage drop ΔV at a time of starting the discharging by the current I was obtained as the direct current resistance (DCR).

Table 3 shows evaluation results.

TABLE 3

| Electrochemical device No. | Log differential pore volume $P_1$ at first peak (mL/g) | Log differential pore volume $P_2$ at second peak (mL/g) | $P_1/P_2$ | DCR (mΩ) |
|---|---|---|---|---|
| D1 | 0.158 | 0.150 | 1.05 | 18.96 |
| D2 | 0.218 | 0.157 | 1.39 | 15.16 |
| D3 | 0.242 | 0.156 | 1.55 | 14.07 |
| D4 | 0.275 | 0.161 | 1.71 | 12.81 |
| D5 | 0.304 | 0.166 | 1.83 | 11.42 |
| D6 | 0.345 | 0.165 | 2.09 | 11.66 |
| D7 | 0.400 | 0.170 | 2.35 | 11.58 |
| D8 | 0.431 | 0.171 | 2.52 | 11.63 |
| D9 | 0.441 | 0.169 | 2.61 | 11.55 |
| D10 | 0.463 | 0.174 | 2.66 | 11.38 |

TABLE 3-continued

| Electrochemical device No. | Log differential pore volume $P_1$ at first peak (mL/g) | Log differential pore volume $P_2$ at second peak (mL/g) | $P_1/P_2$ | DCR (mΩ) |
|---|---|---|---|---|
| D11 | 0.529 | 0.173 | 3.06 | 11.24 |
| D12 | 0.571 | 0.182 | 3.14 | 11.41 |

The log differential pore volume distributions of the positive electrode material layers in the electrochemical devices D1 to D12 were measured by the aforementioned method (Measurement 1). As a result of the measurement, in the log differential pore volume distributions of the positive electrode material layers in the electrochemical devices D1 to D12, two peaks (the first peak and the second peak) were observed in a range of a pore diameter from 0.05 μm to 8 μm, inclusive. The pore diameter at the first peak was in a range of more than 150 nm and less than or equal to 8000 nm. The pore diameter at the second peak was in a range from 50 nm to 150 nm, inclusive.

In the electrochemical devices D1 to D12, neither breakage on the positive electrode current collector nor peeling of the positive electrode material layer from the positive electrode current collector was observed.

In the electrochemical devices D5 to D12 having a $P_1/P_2$ of more than or equal to 1.83, a low DCR was obtained.

INDUSTRIAL APPLICABILITY

An electrochemical device according to the present invention is suitably used for, for example, applications that require a higher capacitance than a capacitance of an electric double-layer capacitor and a higher output than an output of a lithium ion secondary battery.

REFERENCE MARKS IN THE DRAWINGS 10 electrode group
11 bottomed case
12 sealing body
14A, 14B lead wire
15A, 15B lead tab
21 positive electrode
22 negative electrode
23 separator
24 fastening tape

The invention claimed is:

1. An electrochemical device comprising:
   a positive electrode;
   a negative electrode; and
   an electrolytic solution, wherein:
   the electrolytic solution contains an anion and a lithium ion,
   the positive electrode includes a conductive polymer as a positive electrode active material that causes the electrochemical device to perform charging and discharging by doping and dedoping of the anion,
   the negative electrode includes a negative electrode active material that causes the electrochemical device to perform charging and discharging by occluding and releasing the lithium ion,
   the positive electrode includes an electrode current collector and an electrode material layer supported by the electrode current collector,
   the electrode material layer includes at least the conductive polymer, and
   a log differential pore volume distribution of the electrode material layer has at least one peak in a range of a pore diameter of more than or equal to 50 nm.

2. The electrochemical device according to claim 1, wherein the at least one peak exists in a range of a pore diameter from 50 nm to 8000 nm, inclusive.

3. The electrochemical device according to claim 2, wherein:
   the at least one peak includes a first peak and a second peak,
   a log differential pore volume $P_1$ at the first peak is greater than a log differential pore volume $P_2$ at the second peak, and
   a pore diameter at the first peak is greater than a pore diameter at the second peak.

4. The electrochemical device according to claim 3, wherein a ratio $P_1/P_2$ of the log differential pore volume $P_1$ at the first peak to the log differential pore volume $P_2$ at the second peak is more than or equal to 1.83.

5. The electrochemical device according to claim 1, wherein the conductive polymer includes polyaniline.

* * * * *